Oct. 6, 1959　　　　　R. MYERS　　　　2,907,133
DEVICE FOR TROLLING
Filed Dec. 28, 1956
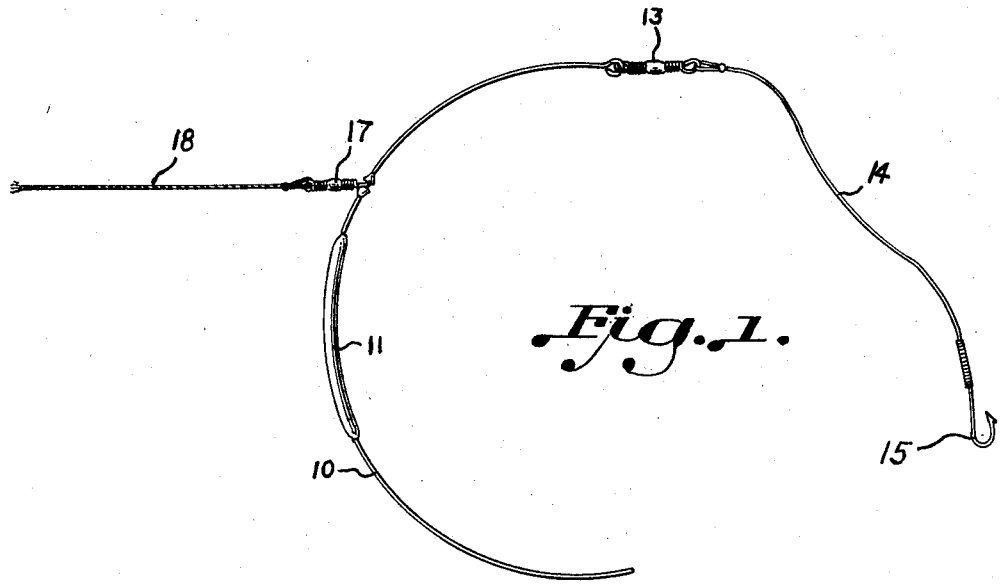
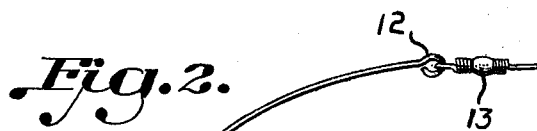
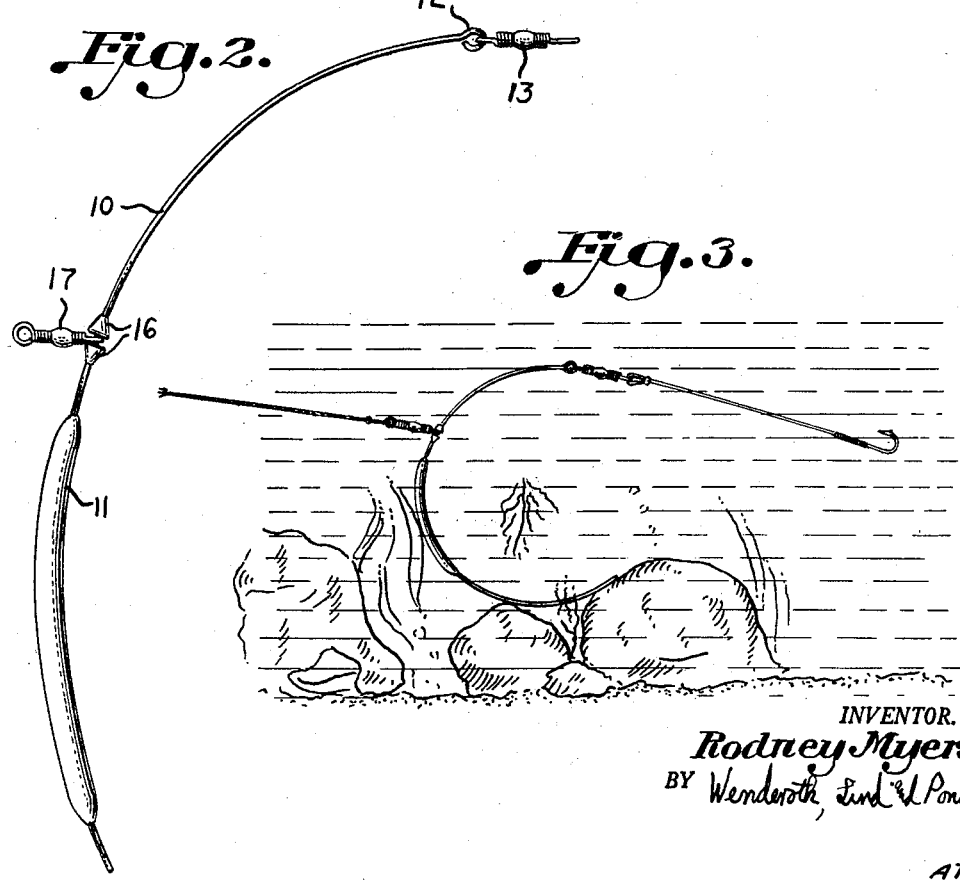
INVENTOR.
Rodney Myers,
BY Wenderoth, Lind & Ponack
ATTYS.

United States Patent Office 2,907,133
Patented Oct. 6, 1959

2,907,133

DEVICE FOR TROLLING

Rodney Myers, Detroit, Mich.

Application December 28, 1956, Serial No. 631,173

3 Claims. (Cl. 43—43.1)

This invention relates to a trolling device for a fishing line and more particularly to a trolling device with a sinker especially adapted for a fishing line used for trolling.

There have been devices designed for trolling which are supposed to keep the sinker, the leader and the fishhook up off the bottom of the body of water in which the trolling is being carried on. The idea is to keep the fishhook and also the sinker from snagging on obstructions on the bottom. However, these devices generally do not have a sufficiently positive action to keep the sinker and fishhook from snagging under all circumstances, and moreover the devices are usually clumsy and unnecessarily complex and expensive to make.

It is an object of this invention to provide a device for use in trolling which overcomes the drawbacks of devices heretofore in use.

It is a further object of this invention to provide a device for use in trolling which has a positive action at all times which serves to keep both the sinker and the fishhook from snagging on objects on the bottom under all circumstances.

It is a still further object of this invention to provide a device which has the above enumerated advantages and which is simple and inexpensive to make.

Other and further objects of the present invention will become apparent from the following description and appended claims together with the accompanying drawing in which:

Fig. 1 is a side elevation of the trolling device according to this invention;

Fig. 2 is an enlarged view of a part of the device of Fig. 1; and

Fig. 3 is a view of the device according to the invention in operation.

The trolling device according to the invention comprises a length of spring wire 10 which in the present embodiment is bent in an open figure such that the ends of the wire are spaced a substantial distance from each other. In the form shown in the drawing, the open figure is substantially semi-circular. A sinker weight 11 is positioned on the spring wire 10. In the form shown in the drawing this weight is located approximately midway of the length of wire 10. It is curved slightly to conform to the curvature of the length of wire 10. A leader attaching means is also provided on the length of spring wire 10 and is spaced from the sinker weight 11. In the form of the invention shown in the drawing the leader attaching means is a leader swivel 13, and it is attached to a loop 12 formed in the length of spring wire 10 at a distance from the sinker weight 11. To this leader swivel 13 may be attached a leader 14 with a fishhook 15 thereon.

Between the weight 11 and the leader swivel 13 there is positioned on the wire line attaching means. In the present embodiment of the invention this means is in the form of two collar like members 16 spaced from each other along the length of the wire. A line swivel 17 is attached to the wire between them. In the embodiment of the invention shown in the drawing the line swivel 17 is attached to the wire 10 only a short distance from the weight along the length of the wire in the direction of the leader swivel 13. A fishing line 18 is attached to the line swivel 17.

It is thus seen that because the line attaching means is positioned between the sinker weight 11 and the leader swivel 13, the sinker weight will act as a pendulum with either the line swivel 17 or the leader swivel 13 as a fulcrum. In either event, the line swivel and the leader swivel will always be kept above the level of the sinker weight. The lower part of the spring wire 10 will thus be kept below the trolling device weight. Therefore, the sinker will always maintain an upright position in the water and the leader swivel 13 with the leader and the fishhook will be spaced from the bottom a distance equal to the opening of the open figure, in the present instance the diameter of the semicircle into which the spring wire 10 is bent.

When the lower part of the spring wire strikes an obstacle on the bottom, it will cause the entire device to ride up over the obstacle. If the obstacle is such as to initially resist the spring wire, then the resiliency of the wire will cause the wire to bend further until the force of the energy stored therein is sufficient to overcome the resistance of the object fouling the wire. The spring force will cause the device to spring away from the object, and the spring wire 10 will resume its initial shape and be ready to encounter the next object.

In the preferred form of the invention, the spring wire 10 is No. 9 spring steel wire bent into a semicircle 15 inches in diameter. A 3 oz. lead sinker weight 11 is secured midway of the length of the wire, leaving approximately a 10 inch length below it. Approximately 1½ inches above the sinker weight is secured the line swivel 17. Two small washers serve as the collar like members 16, the washers being slipped onto the wire and brazed into position.

It is thus seen that there has been provided a simple yet highly effective device for always keeping the sinker weight and fishhook off the bottom and from fouling on objects on the bottom.

It is thought that the invention and its advantages will be understood from the foregoing description and it is apparent that various changes may be made in the form, construction and arrangement of the parts without departing from the spirit and scope of the invention or sacrificing its material advantages, the form hereinbefore described and illustrated in the drawings being merely a preferred embodiment thereof.

I claim:

1. A device for trolling consisting essentially of a length of spring wire bent in a semicircular figure, a sinker weight integral with said length of wire midway of the length thereof, a leader attaching means on one end of said length of wire, and line attaching means on said length of wire between said sinker weight and said leader attaching means, the other end of said spring wire terminating in a smooth curve of the same diameter as the diameter of the semicircle.

2. A device for trolling consisting essentially of a length of spring wire bent in a semicircular figure, a sinker weight integral with said length of wire midway of the length thereof, a leader swivel on one end of said length of wire, a line swivel on said wire between said weight and said leader swivel and spaced a short distance from said weight along said length of wire, the other end of said spring wire terminating in a smooth curve of the same diameter as the diameter of the semicircle.

3. A device for trolling consisting essentially of a spring wire in a semicircular figure, a sinker weight located substantially midway between the ends of said wire, a leader swivel on one end of said wire, and a line swivel on said wire between said weight and said leader swivel, the other end of said spring wire terminating in a smooth curve of the same diameter as the diameter of the semicircle.

References Cited in the file of this patent

UNITED STATES PATENTS

| | | |
|---|---|---|
| 872,934 | Harig | Dec. 3, 1907 |
| 1,123,636 | Wiesenfeld | Jan. 5, 1915 |
| 2,791,060 | Kender | May 7, 1957 |

FOREIGN PATENTS

| | | |
|---|---|---|
| 10,418 | Great Britain | May 17, 1899 |
| 502,508 | Canada | May 18, 1954 |